(12) United States Patent
Kitagawa et al.

(10) Patent No.: US 8,857,966 B2
(45) Date of Patent: Oct. 14, 2014

(54) INKJET PRINTING INK

(75) Inventors: Yosuke Kitagawa, Kyoto (JP); Daisuke Inoue, Kyoto (JP); Hiroshi Shodai, Kyoto (JP)

(73) Assignee: Matsui Shikiso Chemical Co., Ltd., Kyoto-Shi, Kyoto (JP)

( * ) Notice: Subject to any disclaimer, the term of this patent is extended or adjusted under 35 U.S.C. 154(b) by 419 days.

(21) Appl. No.: 13/344,725

(22) Filed: Jan. 6, 2012

(65) Prior Publication Data

US 2012/0306976 A1 Dec. 6, 2012

(30) Foreign Application Priority Data

Jun. 2, 2011 (JP) ................. 2011-124036

(51) Int. Cl.
*C09D 11/00* (2014.01)
*C09D 11/326* (2014.01)

(52) U.S. Cl.
CPC .................... *C09D 11/326* (2013.01)
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 5,912,280 A | 6/1999 | Anton et al. | |
| 2004/0068030 A1* | 4/2004 | Aida ............................. | 523/160 |
| 2010/0273929 A1* | 10/2010 | Kitagawa et al. ............. | 524/502 |

FOREIGN PATENT DOCUMENTS

| | | |
|---|---|---|
| JP | S62-231787 A | 10/1987 |
| JP | H10-195362 A | 7/1998 |
| JP | H11-172180 A | 6/1999 |
| JP | 2002-338859 A | 11/2002 |
| JP | 2003-268271 A | 9/2003 |
| JP | 2004-067807 A | 3/2004 |
| JP | 2006-218791 A | 8/2006 |
| JP | 2007-522285 A | 8/2007 |
| JP | 2009-215506 A | 9/2009 |
| WO | WO 2005/071026 A1 | 8/2005 |

* cited by examiner

*Primary Examiner* — Laura Martin
(74) *Attorney, Agent, or Firm* — Wolf, Greenfield & Sacks, P.C.

(57) ABSTRACT

An inkjet printing ink having properties of crosslinking and being fixed on a fiber by heating, characterized in that in an ink composition consisting of (A) a pigment dispersion having a mean particle diameter of 200 nm or less and a maximum particle diameter of 500 nm or less, consisting of a pigment, a water-soluble pigment dispersant and a hydrophilic solvent, (B) a water-soluble fixing agent, and (C) a crosslinking agent, the water-soluble pigment dispersant in (A) is a specific emulsion polymer neutralized by a basic substance; the water-soluble fixing agent (B) is the one having a crosslinking functional group; and the crosslinking agent (C) is the one having a functional group that crosslinks the crosslinking functional group of the water-soluble pigment dispersant in (A) with the crosslinking functional group of the water-soluble fixing agent (B) at a temperature of 100° C. or more.

23 Claims, No Drawings

INKJET PRINTING INK

FIELD OF THE INVENTION

The present invention relates to an inkjet printing ink. More specifically, the present invention relates to an inkjet printing ink which, upon printing a desired design using an inkjet printer, can be stably ejected into fine patterns, can firmly fix pigments on the fibers by heating at 100° C. or more, and can provide colored fabric of fibers with soft texture and good fastness.

BACKGROUND OF THE INVENTION

Conventionally, either dye or pigment is used for coloring fibers. In case of coloring with a dye, different dyes (colorants) in structure thereof are used for different kinds of fibers; namely, reactive dyes or direct dyes for cellulose fibers such as cotton and hemp, acid dyes for animal fibers such as wool and silk, acid dyes and disperse dyes for nylon fibers, disperse dyes for polyester fibers, and cationic dyes for acrylic fibers. Depending on the fibers to be colored, these dyes are selected and used for coloring by various dyeing processes.

In addition, when conventional dyes are used for printing a pattern on fibers, a printing paste in which an appropriately selected dye is blended in an aqueous paste is used for printing various designs by a screen stencil. Thereafter, treatments such as drying, steaming, washing with water, soaping, and drying are carried out to obtain colored fibers.

In contrast, when pigments are used for printing a pattern on fibers, a pigment dispersion wherein a water-soluble anionic or nonionic surfactant, a pigment, and a hydrophilic solvent are wet-dispersed by a milling machine that uses glass beads, zirconia beads, titania beads, or stainless balls, is used as the colorant, and this colorant together with a emulsion resin for pigment fixation and a reducer is screen printed, dried, and heat-treated to color the pattern on the fibers.

Therefore, compared to dyes, pigments do not require selection of colorant depending on the kind of fibers, and their processing methods are simple, without requiring steaming process or processes of washing with water and soaping; accordingly, no energy cost is required, and no waste liquid is generated. Thus, this is a safe processing method in terms of environment.

However, pigments have disadvantages in that they require a large amount of emulsion resin for fixing the pigments in order to maintain fastness such as washing fastness. As a result, the texture of the colored fabric tends to harden, and a water-insoluble film is generated due to drying of the fixing agent during processing, leading to a problem of clogging.

Accordingly, coloring with pigments is inferior to coloring with dyes in terms of quality as clothing.

Here, the above-mentioned points relate to methods for coloring fibers using conventional dyes and pigments, in which a screen stencil is required for the formation of design.

In recent years, when coloring fibers, the number of cases of coloring in a small lot and of multiple kinds of products within a short delivery time has increased, resulting in a problem of cost, time, expense and labor of screen stencil making; accordingly, a coloring method by inkjet systems with which printing with no plate-making is possible has been developed, and coloring fibers with dyes has been spreading.

In coloring fibers with dyes using inkjet systems, a dye solution is printed on a fabric that has been pretreated with a cellulose paste, which is then steamed, washed with water and soaped, and dried to give a colored fiber.

In addition, a method wherein a dispersing dye ink is printed on paper by inkjet system then sublimation-transferred on a polyester fiber, has been carried out.

However, since any of these methods use dyes as a colorant, processes of drying, steaming, washing with water, soaping and drying are required after printing. Moreover, only specific fibers can be colored. Therefore, coloring with pigments which enables coloring of any fibers by a simple method has been desired.

Meanwhile, when pigments are used as a colorant in inkjet printing, excellent long-term storage stability of pigments at low viscosity as well as jetting stability such as no clogging of inkjet nozzles are required; in addition to these, upon coloring on fibers, soft texture and good fastness are also required.

As means for solving the above problems in using pigments as a colorant, the following methods (1)-(9) have been proposed.

(1) A method wherein a pigment is fixed to fibers by adding a crosslinking agent to an ink comprising the pigment and a water-soluble polyester or polyamide component as ink components (refer to Patent Literature 1).

(2) An aqueous recording liquid with excellent long-term storage stability, in which its inkjet colorant is prepared as follows: a pigment is dispersed with an organic polymer compound having a neutralized anionic group, then acid deposition is applied by adding an acid, and the pigment surface is coated with the organic polymer compound, then water and a base are added for solubilization to make a microencapsulated pigment; which is used as the inkjet colorant (refer to Patent Literature 2).

(3) An inkjet printing pigment ink excellent in printing stability, jetting stability, storage stability, and washing fastness, which is prepared as follows: a pigment is dispersed with an organic polymer compound having an anionic group polymerized in an solvent, the solvent is distilled away, then acid deposition is applied by adding an acid, and the pigment surface is coated with the organic polymer compound, then water and a base are added for solubilization to make a microencapsulated pigment, to which blocked isocyanate is blended; this ink is used for inkjet printing, then heat treatment is applied to achieve the above excellent properties (refer to Patent Literature 3).

(4) An inkjet printing ink comprising a colorant in which a pigment is enclosed by a polymer having a crosslinking structure, a water-soluble organic solvent, and water (refer to Patent Literature 4).

(5) An inkjet printing ink, characterized in that at least a pigment, a resin having a carboxylic group, a water-soluble melamine resin, 1,2-alkylene glycol, and water are contained in the ink composition (refer to Patent Literature 5).

(6) An inkjet printing ink for fibers, consisting of a pigment, a water-dispersing resin, blocked isocyanate as a crosslinking agent, and water (refer to Patent Literature 6).

(7) An inkjet ink, wherein, in the ink comprising an aqueous carrier medium and an insoluble colorant, a core-shell or tetrafluoroethylene emulsion polymer is contained as an additive for improving water resistance (refer to Patent Literature 7).

(8) An inkjet ink especially suitable for printing on a fabric, comprising a cross-linked polyurethane dispersion (refer to Patent Literature 8).

(9) A material to be recorded by inkjet systems excellent in image clearness, water resistance, light resistance, and color development, wherein, as the ink-receiving layer, a mixture comprising an aqueous emulsion-type acrylic adhesive with a glass transition temperature from −50 to −10° C. and a water-soluble cationic polymer, as its main components, is preprocessed on a polylactic acid fiber (refer to Patent Literature 9).

However, as described hereinafter, the above Patent Literatures 1-9 have the following problems and they are not satisfactory.

In Patent Literature 1, water-soluble polyester resin or polyamide resin is to be used as a pigment dispersant; however, viscosity of the pigment dispersion becomes too high as an ink for inkjet systems, causing a problem of an increase in the viscosity during storage. Accordingly, stable inkjet printing cannot be carried out. In addition, sufficient quality in the fastness and texture as a fiber cannot be provided.

In Patent Literature 2, due to solubilization with a base after acid deposition, large particles are present due to residues of insoluble substances, causing clogging in inkjet system; thus stable and long-term inkjet printing is not possible.

Patent Literature 3 has the following various disadvantages: a) complex processes are required, such as a pigment is once finely dispersed with a solvent, then after acid deposition, an organic polymer compound is fixed on the pigment surface, and a base is blended for solubilization to make a colorant; b) when a blocked isocyanate is blended in this colorant to color fibers and then heat treatment is applied, its fixing strength to the fibers is weak and lack of fastness is expected, and therefore sufficient fastness cannot be obtained; c) after acid deposition of the pigment, in the process of solubilization with a base, aggregation of the pigments may possibly be induced, causing deteriorated stability of the ink during long-term storage, d) the viscosity of the pigment dispersion wherein a pigment is dispersed with these pigment dispersants is high, and when the pigment is dispersed with high concentration, viscosity of the ink increases and an ink with high concentration as a coloring ink for inkjet systems cannot be obtained.

In Patent Literatures 4 and 5, similar to Patent Literatures 2 and 3, a pigment whose surface is coated with a resin by acid deposition or phase inversion is used; therefore, there are the same problems as those in Patent Literature 2 and 3. In addition, since a process of crosslinking the coated pigment by a crosslinking agent is carried out, these inventions are not excellent in terms of clogging, jetting stability and long-term storage stability, similar to Patent Literatures 2 and 3. Moreover, in the invention of Patent Literature 5, a pigment is fixed on a fiber by means of crosslinking the resin having a carboxylic group by a water-soluble melamine resin; and because the water-soluble melamine resin generates harmful formaldehyde, this is not an environmentally good method, and making the ink in one liquid is difficult.

In Patent Literature 6, a water dispersing resin for fixing which also functions as a pigment dispersant is used; however, when a water dispersing resin is used as a pigment dispersant, the dispersion viscosity of the pigment increases, resulting in that the pigment dispersion with low viscosity suitable for inkjet inks cannot be obtained; in addition, since the water dispersing resin forms a water-insoluble film upon drying, time-course stable jetting stability upon inkjet printing cannot be obtained and clogging at nozzle end is predicted; thus, this is not an appropriate ink for inkjet printing.

In Patent Literatures 7 and 8, a core-shell emulsion polymer, a tetrafluoroethylene emulsion polymer or a cross-linked polyurethane dispersion is used. However, these resin emulsions and dispersions form a water-insoluble film upon drying, these are not the inks suitable for inkjet printing, similar to the above Patent Literature 6.

Finally, in Patent Literature 9, a fiber is pretreated with a mixture comprising, as the main components, an aqueous emulsion-type acrylic adhesive and a water-soluble cationic polymer so that the entire surface of the fiber is coated with the resin film; accordingly, it is expected that the fiber has hard texture and its air permeability is inhibited, and clear images cannot be obtained due to repelling of the ink. Thus, the invention cannot provide a satisfactory method as coloring method of fibers.

As described above, in coloring fibers by inkjet systems, coloring with dyes is superior in terms of quality of the colored fabric (texture, fastness), but selection of a dye is necessary depending on the kind of fiber, and there are problems in process efficiency and facility, resource consumption, as well as environmental problems due to generation of waste liquid.

In contrast, coloring with pigments requires a simple process without selection of colorant depending on the kind of fiber, but it has problems such as, many of them are inferior in long-term storage stability, jetting stability, nozzle clogging, and quality of the colored fabric (texture, fastness).

Thus, development of a coloring method of fibers with pigments by inkjet systems, which exhibits no problem in workability, and provides excellent quality of colored fabric (texture, fastness), has been awaited.

CITATION LIST

[Patent Literature 1] JP A 62-231787
[Patent Literature 2] JP A 11-172180
[Patent Literature 3] JP A 2003-268271
[Patent Literature 4] JP A 2002-338859
[Patent Literature 5] JP A 2004-67807
[Patent Literature 6] JP A 2009-215506
[Patent Literature 7] JP A 10-195362
[Patent Literature 8] JP A 2007-522285
[Patent Literature 9] JP A 2006-218791

SUMMARY OF THE INVENTION

A problem to be solved by the present invention is to provide a method for coloring fibers with a pigment by inkjet system, which exhibits no problem in workability and shows excellent quality of colored fabric (texture, fastness).

As a result of strenuous efforts in the research to solve the above problem, the present inventors found that, in coloring fibers with pigments, a pigment dispersion that has a low viscosity even when it is made into microparticles having a particle diameter suitable for inkjet pigment, that is, a mean particle diameter of 20 nm or less and the maximum particle diameter of 500 nm or less, can be obtained by means of using a water-soluble pigment dispersant having a specific structure of the present invention for dispersing the pigment, and that the obtained pigment dispersion is stable without aggregation or precipitation for a long period of time.

In addition, the present inventors found that, in the pigment dispersion of the present invention, by blending a water-soluble fixing agent having a crosslinking functional group and a crosslinking agent having two ore more groups having a reactivity by heating at 100° C. or more to make an inkjet printing ink, and by heating to 100° C. or more to induce crosslinking reaction between the water-soluble pigment dispersant, the water-soluble fixing agent and the crosslinking agent, then the polymer pigment dispersant and the water-soluble fixing agent become insoluble to water and react as a pigment fixing agent.

Namely, the present invention has overcome the conflicting problems, and achieved that a) the ink before heat treatment is in a condition of being soluble to water and has excellent jetting stability, and b) by heating after printing, the ink acts as a water-insoluble pigment-fixing agent to give water-resisting fastness.

Moreover, the inkjet printing ink of the present invention can generate fine patterns in a stable manner upon printing a desired design by a piezo-type inkjet printer, and the pigments can be fixed firmly on a fiber by heating at 100° C. or more, providing fiber-colored fabric having soft texture and excellent fastness.

As stated above, as a result of further research, the present invention has been accomplished.

The present invention includes the following:

1. An inkjet printing ink comprising (A) a pigment dispersion having a mean particle diameter of 200 nm or less and a maximum particle size of 500 nm or less, consisting of a pigment, a water-soluble pigment dispersant, and a hydrophilic solvent, (B) a water-soluble fixing agent, and (C) a crosslinking agent.

2. The inkjet printing ink according to the above 1, having properties of crosslinking and being fixed on a fiber by heating, wherein the water-soluble pigment dispersant in (A) is an emulsion polymer having a molecular weight of 2,000-20,000 consisting of (1) 20-80 parts of (meth)acrylic acid ester monomer represented by $CH_2=CR^1-COOR^2$ (wherein $R^1$ denotes a hydrogen atom or a methyl group, $R^2$ denotes an alkyl group with a carbon number of 2-8), (2) 80-20 parts of an aliphatic vinyl monomer comprising a carboxyl group, and (3) 0-20 parts of an aliphatic vinyl monomer comprising a non-carboxylic crosslinking functional group, which is neutralized by a basic substance; the water-soluble fixing agent (B) comprises a crosslinking functional group; and the crosslinking agent (C) comprises a functional group that crosslinks the crosslinking functional group of the water-soluble pigment dispersant in (A) and the crosslinking functional group of the water-soluble fixing agent (B) at a temperature of 100° C. or more.

3. The inkjet printing ink according to 1 or 2, wherein the emulsion polymer used for the water-soluble pigment dispersant in (A) has been polymerized under the presence of a reactive surfactant.

45. The inkjet printing ink according to any one of the above 1 to 3, wherein the aliphatic vinyl monomer (2) comprising a carboxyl group of the water-soluble pigment dispersant in (A) is one or more selected from the group consisting of acrylic acid, methacrylic acid, itaconic acid, maleic acid, and fumaric acid.

5. The inkjet printing ink according to any one of the above 1 to 4, wherein a secondary amine or a tertiary amine is used as the basic substance for neutralizing the emulsion polymer with a molecular weight of 2,000-20,000 that constitutes the water-soluble pigment dispersant in (A).

6. The inkjet printing ink according to any one of the above 1 to 5, wherein the amount of blending of the water-soluble pigment dispersant in (A) is 5-40 mg per 1 m² of surface area of the pigment.

7. The inkjet printing ink according to any one of the above 1 to 6, wherein a polyoxyethylene styrenated phenyl ether sulfate or a polyoxyethylene alkyl ether sulfate is used as an aid of dispersing ability of the water-soluble pigment dispersant in (A).

8. The inkjet printing ink according to any one of the above 1 to 7, wherein the ratio of the blending amounts of the pigment to the water-soluble pigment dispersant in (A) is 1:0.1-2.0.

9. The inkjet printing ink according to any one of the above 1 to 8, wherein the water-soluble fixing agent (B) is one or more selected from the group consisting of water-soluble urethane resin, water-soluble epoxy resin, water-soluble acrylic resin, and modified polyvinyl alcohol (PVA).

10. The inkjet printing ink according to the above 9, wherein the glass transition point (Tg) of the water-soluble fixing agent (B) is in the range between −60° C. and 20° C.

11. The inkjet printing ink according to the above 9, wherein the water-soluble urethane resin as the water-soluble fixing agent (B) comprises a carboxyl group and a hydroxyl group which function as both a crosslinking functional group and a hydrophilic group, and has an acid number of 20-90 mg KOH/g and a hydroxyl number of 20-70 mg KOH/g.

12. The inkjet printing ink according to any one of the above 1 to 11, wherein a hot melt resin with a maximum particle diameter of 500 nm or less is used as an aid of fixing ability of the water-soluble fixing agent (B).

13. The inkjet printing ink according to any one of the above 1 to 12, wherein a water-soluble or self-emulsifying crosslinking agent is used as the crosslinking agent (C) to obtain a property of excellent re-dispersibility.

14. The inkjet printing ink according to any one of the above 1 to 13, wherein the crosslinking agent (C) is a blocked isocyanate compound in which a trimethylol propane (TMP) adduct or isocyanurate of hexamethylene diisocyanate (HDI), hydrogenated xylene diisocyanate (H6XDI), isophorone diisocyanate (IPDI) or dicyclohexylmethane diisocyanate (H12MDI) as an isocyanate is blocked.

15. The inkjet printing ink according to the above 14, wherein the crosslinking agent (C) is a blocked isocyanate compound which is blocked by diethyl malonate (DEM), diisopropyl amine (DIPA), 1,2,4-triazol (TRIA), 3,5-dimethylpyrazol (DMP) or 2-butanone oxime (MEKO) as a blocking agent.

16. The inkjet printing ink according to any one of the above 1 to 15, wherein the viscosity is in the range of 3-15 mPa·s at 20° C.

17. The inkjet printing ink according to any one of the above 1 to 16, wherein the surface tension is in the range of 27-38 mN/m.

18. The inkjet printing ink according to any one of the above 1 to 17, wherein large pigment particles of 500 nm or more are filtered off and separated by a filter or centrifugation.

19. The inkjet printing ink according to the above 1 to 18, consisting of (A) a pigment dispersion having a mean particle diameter of 200 nm or less and a maximum particle diameter of 500 nm or less, and consisting of a pigment, a water-soluble pigment dispersant, and a hydrophilic solvent, (B) a water-soluble fixing agent, and (C) a crosslinking agent, wherein the water-soluble pigment dispersant in (A) is an emulsion polymer having a molecular weight of 2,000-20,000 consisting of (1) 20-80 parts of (meth)acrylic acid ester monomer represented by $CH_2=CR^1-COOR^2$ (wherein $R^1$ denotes a hydrogen atom or a methyl group, $R^2$ denotes an alkyl group with a carbon number of 2-8), (2) 80-20 parts of an aliphatic vinyl monomer comprising a carboxyl group, and (3) 0-20 parts of an aliphatic vinyl monomer comprising a non-carboxylic crosslinking functional group, which is neutralized by a basic substance; the water-soluble fixing agent (B) comprises a crosslinking functional group; and the crosslinking agent (C) comprises a functional group that crosslinks the crosslinking functional group of the water-soluble pigment dispersant in (A) and the crosslinking functional group of the water-soluble fixing agent (B) at a temperature of 100° C. or more.

20. An inkjet printing method comprising printing a fiber with the inkjet printing ink according to any one of the above 1 to 19 by inkjet system, and heat-treating the fiber at a temperature of 100° C. or more.

21. The inkjet printing method according to the above 20, wherein the fiber is pretreated with a cationic compound by padding method, coating method, screen printing method, spraying method or inkjet method.

22. The inkjet printing method according to the above 21, wherein the fiber is pretreated with one or more selected from the group consisting of urethane resin emulsion, acrylic resin emulsion and crosslinking agent, in addition to the cationic compound.

23. An inkjet printing method according to any one of the above 20-22, wherein the fiber is post-treated with a post-treatment agent by padding method, coating method, screen printing method, spraying method or inkjet method.

24. The inkjet printing method according to the above 23, wherein the post-treatment agent is one or more selected from the group consisting of acrylic resin emulsion, urethane resin emulsion, silicone oil, plasticizer, and crosslinking agent.

25. A fiber printed by the inkjet printing method according to any one of the above 20-24.

DETAILED DESCRIPTION OF CERTAIN EMBODIMENTS

The present invention has been made based on the following findings:
1) Problems in Conventional Technology In coloring fibers with conventional pigments by inkjet printing system, as mentioned in the section of Background Art, a non-ionic surfactant or an anionic surfactant as the pigment dispersant is blended with water, a hydrophilic solvent such as wetting agent, and an emulsion resin as a fixing agent to make an ink, and a desired pattern is printed and colored on a fiber with the ink. Alternatively, the ink is printed on a fabric pretreated with a cationic polymer and an acrylic emulsion resin (adhesive agent). Alternatively, as a coated pigment, a pigment is dispersed with an organic polymer compound having an anionic group polymerized in an solvent, the solvent is distilled away, then acid deposition is applied by adding an acid to coat the pigment surface with the organic polymer compound; then, water and a base are added for solubilization to make a micro-encapsulated pigment, to which a blocked isocyanate is blended to make an ink; printing is carried out with this ink by inkjet system, and heat treatment is applied to color fibers. As an alternative method, a pigment is dispersed with a water-dispersing resin, and a blocked isocyanate is added as a crosslinking agent, and heating is applied to color fibers; however, these methods have the following problems.

(Problem 1)

Non-ionic surfactants or anionic surfactants as a conventional pigment dispersant have a high dispersing ability, so that they can make a pigment dispersion with excellent long-term stability; therefore they are suitable for inkjet pigment dispersions. However, upon coloring, they inhibit fixing of the pigment due to their low affinity to fibers, and also surfactants remaining on the fiber deteriorate washing fastness and rubbing fastness due to their water solubility.

(Problem 2)

Micro-encapsulated pigments wherein a pigment is dispersed with an organic polymer compound having an anionic group, which are subjected to acid deposition and re-dissolved with a base can have increased water resistance due to the coating of the pigment surface with the organic polymer; however, their productivity is low because extremely complex production processes are required. Furthermore, since acid deposition and re-dissolution with a base are required after dispersion, a part of the pigment aggregates and problems such as a decrease in the coloring concentration during long-term storage, occurrence of separation and sedimentation, an increase in viscosity, and occurrence of nozzle clogging may arise. Moreover, the pigment dispersion which uses water-dispersing resin that acts also as a fixing agent is strongly lipophilic due to its water-dispersibility, and shows high viscosity during dispersing the pigments. In addition, when water as a solvent volatilizes, it becomes insoluble to water, leading to a problem of occurrence of clogging of nozzle end. As an alternative method, water-soluble polyester resin or polyamide resin is used as the pigment dispersant, and its functional group is cross-linked by a crosslinking agent to fix the pigment on fibers; however, while the cross-linked body of the polyester resin or polyamide resin exhibits excellent water resistance, as a pigment dispersant, its low dispersion stability and high initial viscosity inhibit the provision of a coloring ink with high concentration, which is problematic.

(Problem 3)

In a method wherein cationic polymer and acrylic emulsion resin are previously coated on a fiber surface in order to fix pigments on the fiber and inkjet printing is adopted to this surface to fix the pigment on the fiber, the fixed pigment is only fixed ionically on the surface, and no sufficient fastness is maintained. In addition, here an acrylic resin (an adhesive) is co-used with a cationic polymer; however, the pigment is only surface-adhered to the resin surface due to its dried resin film, and fastness as the fiber cannot be sufficiently maintained. Moreover, since a pretreatment agent is applied to the entire fibers, it may deteriorate texture and tactile sense and inhibit air permeability.

Furthermore, to fix a pigment on the fiber surface without pretreatment, a large amount of emulsion resin for fixing is blended in an ink for printing; while the emulsion resin for fixing can strongly adhere the pigment to fibers, it forms a water-insoluble film upon drying, so that when a large amount is blended, it causes clogging of inkjet nozzles and harden the texture.

The same problem arises with the water-dispersing resin which simultaneously serves as a fixing agent and a pigment dispersant.

(Problem 4)

As a solution to the problem of jetting property due to blending of a large amount of emulsion resin as stated in the problem 3, there is a method to delay drying by blending a large amount of wetting agent; however, blending a large amount of wetting agent significantly decreases fastness, and therefore the problem of workability has not been completely solved; moreover, even when a large amount of wetting agent is blended, clogging of nozzle end cannot be completely eliminated.

(Problem 5)

In the method wherein inkjet printing is carried out using a pigment coated with an organic polymer compound having a carboxyl group to which blocked isocyanate and water are added, then the fiber is colored by heating, the pigment can be made to be insoluble to water at the fiber surface due to the reaction between the carboxyl group and isocyanate group; however, the coated pigment has a problem in terms of long-term storage stability because of its complex production process. Moreover, the reaction between carboxyl group and isocyanate group alone is not sufficient for the fastness as a fiber.

2) Solution

It has been found that the above problems can be solved by the following methods.

(Solution 1)

An emulsion polymer with a molecular weight of 2,000-20,000 consisting of (1) 20-80 parts of (meth)acrylic acid ester monomer represented by $CH_2=CR^1-COOR^2$ (wherein $R^1$ denotes a hydrogen atom or a methyl group, $R^2$ denotes an alkyl group with a carbon number of 2-8), (2) 80-20 parts of a non-aromatic vinyl monomer having a carboxyl group, and (3) 0-20 parts of an aliphatic vinyl monomer having a crosslinking functional group, which is neutralized by a basic substance, is used as the water-soluble pigment dispersant, and by finely-dispersing the pigment by a milling machine, a pigment dispersion of low viscosity and high concentration that is stable for a long time can be obtained, enabling to make a pigment dispersion for inkjet systems having excellent long-term storage stability of the ink in an inkjet cartridge, excellent printing workability and high coloring strength.

In addition, by carrying out neutralization of the water-soluble pigment dispersant using a secondary amine or tertiary amine, good re-solubility can be obtained and clogging of nozzle end can be prevented.
(Solution 2)

To the pigment dispersion of the solution 1, a water-soluble fixing agent having a crosslinking functional group and a crosslinking agent having two or more groups having a reactivity upon being heated at 100° C. or more are blended to make an inkjet printing ink, and by heating at 100° C. or more, a crosslinking reaction between the water-soluble pigment dispersant, the water-soluble fixing agent and the crosslinking agent is induced, so that the water-soluble polymer-type pigment dispersant and the water-soluble fixing agent become insoluble to water and function as a pigment fixing agent; thus, inkjet printing on fibers can be carried out in a stable manner without clogging of nozzle end, and the printed colored fiber becomes a fiber fabric with high fastness without deteriorating its texture.

Furthermore, by co-using a hot melt resin with a maximum particle diameter of 500 nm or less as a fixing auxiliary agent, fastness as the fiber can be further improved.
(Solution 3)

The inkjet printing ink of the present invention can fix the pigment on fibers without using emulsion resin or dispersion resin as in the case of inkjet coloring ink using conventional pigment dispersions. As a result, stable jetting property without clogging of inkjet nozzle can be obtained, and colored fabric with excellent quality compared to those colored by dyes having air-permeability can be obtained, in which fastness of the fiber fabric is maintained while not inhibiting the texture of the fiber fabric.
(Solution 4)

Since the crosslinking agent used in the present invention is the one that induces reactivity upon heating at 100° C. or more, it does not have a reactivity during storage, i.e., under normal temperature atmosphere, so that stability can be maintained during long-term storage in an ink cartridge. Accordingly, an ink that is stable for a long time can be realized.
(Solution 5)

The inkjet printing ink of the present invention maintains a water-soluble state when no heat treatment is applied. Therefore, even when water evaporates and dries at the nozzle end during printing with this ink, the ink is soluble to water so that the ink itself can re-disperse, resulting in no clogging of the nozzle and continuous inkjet printing is possible. In addition, when printing is re-started from a resting state, a printable state can be easily resumed by means of cleaning operation using hydrophilic solvent or alkaline water.
(Solution 6)

When the water-soluble pigment dispersant of the present invention is mixed with a pigment and a hydrophilic solvent, and wet-dispersed using a beads mill, a pigment dispersion with a mean particles diameter of 200 nm or less and a maximum particle diameter of 500 nm or less suitable for inkjet printing can be obtained; therefore, complex processes including acid deposition used for making conventional pigments to be resistant to water and re-dissolution with a base are not necessary, and a pigment dispersion with excellent stability can be easily obtained.
(Solution 7)

When an aromatic ring is contained in the composition of a pigment dispersant, while water resistance improves, viscosity upon pigment dispersion increases, resulting in a difficulty in obtaining a pigment dispersion with high concentration. Accordingly, in the present invention, using a water-soluble pigment dispersant obtained from a monomer without an aromatic ring, a finely-dispersed pigment with low viscosity and high concentration can be obtained, enabling to provide a pigment dispersion suitable for inkjet printing inks.
(Solution 8)

Before the inkjet printing ink of the present invention is printed, a fiber to be printed is pretreated with a cationic compound, etc. using padding method, coating method, screen printing method, spraying method or inkjet method, then the print can be made more clear with higher concentration, and fastness as the fiber can be improved.
(Solution 9)

After the inkjet printing ink of the present invention is printed on a fiber, the fiber is post-treated with acrylic resin emulsion, urethane resin emulsion, silicone oil, and a plasticizer, etc. using padding method, coating method, screen printing method, spraying method or inkjet method, then the fastness as the fiber can be improved; moreover, when both of the pretreatment and post-treatment are performed, fastness can further be improved.

Based on the above solutions, the inkjet coloring composition of the present invention enables, in addition to the advantages of the conventional inkjet printing due to no screen stencil making such as extremely efficient printing performance for small lots and multiple kinds of products within a short delivery time, excellent jetting stability during printing and strong pigment fixation on fibers after printing, by means of crosslinking a water-soluble pigment dispersant with a water-soluble fixing agent after printing and using this as the pigment fixing agent; thus, by adopting such an unique and rational means, the present invention enables production of high-quality colored fiber products with good texture and fastness without the problem in long-term storage and continuous printing property of the ink.

With the inkjet printing ink, because the pigment dispersion using a specific water-soluble pigment dispersant, the specific water-soluble fixing agent and the specific crosslinking agent are used as essential components, a synergetic effect from the reaction of the water-soluble pigment dispersant with the crosslinking agent, the reaction of the crosslinking functional group of the water-soluble fixing agent with the crosslinking agent, and the condensation reaction of the crosslinking agent itself is generated, and when any one of the above lacks, then the object of the present invention cannot be achieved, indicating that the selection of the constitution of the present invention has a special meaning.

Hereinafter, the structural aspects of the present invention are explained.
1. Components of Inkjet Printing Ink The inkjet printing ink of the present invention comprises (A) a pigment dispersion having a mean particle diameter of 200 nm or less and a maximum particle diameter of 500 nm or less, consisting of a pigment, a water-soluble pigment dispersant and a hydrophilic solvent, (B) a water-soluble fixing agent, and (C) a crosslinking agent. Hereinafter, each component of this inkjet printing ink is explained in detail.

(A) Pigment dispersion having mean particle diameter of 200 nm or less and maximum particle diameter of 500 nm or less, consisting of pigment, water-soluble pigment dispersant and hydrophilic solvent The pigment dispersion of the present invention comprises (A1) a pigment, (A2) a water-soluble pigment dispersant and (A3) a hydrophilic solvent, which is obtained by (A5) wet-dispersion using a milling machine. In addition, if necessary, (A4) a dispersion auxiliary may be used for aiding dispersing ability.

(A1) Pigment

As the pigment of the present invention, any pigments that can be used as colorants of fiber products may be used, regardless of organic pigments or inorganic pigments.

Examples include black pigments such as carbon black and iron oxide black pigment, etc., red pigments such as azo pigment, quinacridone pigment, chromphthal pigment, diketopyrrolopyrrole pigment, anthraquinone pigment, etc., yellow pigments such as azo pigment, imidazolone pigment, titanium yellow pigment, etc., orange pigments such as indanthrene pigment, azo pigment, etc., blue and green pigments such as phthalocyanine pigment, violet pigments such as dioxazine pigment, quinacridone pigment, etc., white pigments such as titanium oxide, aluminum silicate, silicate oxide, etc., but are not limited thereto.

(A2) Water-Soluble Pigment Dispersant

The water-soluble pigment dispersant of the present invention is (A2-d) an emulsion polymer consisting of (A2-a) a (meth)acrylic acid ester monomer, (A2-b) an aliphatic vinyl monomer having a carboxyl group, and (A2-c) an aliphatic vinyl monomer having a crosslinking functional group, which is neutralized with (A2-e) a basic substance.

(A2-a) (Meth)Acrylic Acid Ester Monomer

The (meth)acrylic acid ester monomer of the present invention is represented by $CH_2=CR^1-COOR^2$ (wherein $R^2$ denotes a hydrogen atom or a methyl group, $R^2$ denotes an alkyl group with a carbon number of 2-8); when $R^2$ is a hydrogen atom or has a carbon number of 1, then the water resistance lacks, and when $R^2$ has a carbon number of 9 or more, then the dispersibility deteriorates; when $R^2$ has an aromatic ring, then the viscosity increases and the time-course viscosity stability deteriorates.

Examples of the (meth)acrylic acid ester monomer include, for example, ethyl(meth)acrylate, propyl(meth)acrylate, butyl(meth)acrylate, pentyl(meth)acrylate, hexyl(meth)acrylate, heptyl(meth)acrylate, 2-ethyl hexyl(meth)acrylate, etc.; these may be used singly, or in a combination of two or more kinds.

(A2-b) Aliphatic Vinyl Monomer Having Carboxyl Group

Examples of the aliphatic vinyl monomer having a carboxyl group of the present invention include acrylic acid, methacrylic acid, itaconic acid, maleic acid, fumaric acid, etc., and these may be used singly, or in a combination of two or more kinds.

An aromatic vinyl monomer cannot be used from the viewpoint of an increase in dispersion viscosity, and stability.

(A2-c) Aliphatic Vinyl Monomer Having Non-Carboxylic Crosslinking Functional Group The aliphatic vinyl monomer having a non-carboxylic crosslinking functional group of the present invention is not particularly limited as long as it is an aliphatic vinyl monomer having a crosslinking functional group excluding a carboxyl group that can copolymerize the above (meth)acrylic acid ester monomer, and examples include (meth)hydroxyl acrylate, (meth)acrylonitrile, acrylamide, urethane group-containing vinyl monomer having a hydroxyl group, epoxy group-containing vinyl monomer, ester group-containing vinyl monomer formed from a monomer of a high-order carboxylic acid with polyalcohol, etc., silicone group-containing vinyl monomer formed from organosiloxane, etc., vinyl sulfonic acid, 2-acrylamide-2-methylpropane sulfonic acid, sulfate ester of 2-hydroxyalkyl(meta)acrylate, vinylphosphonic acid, sulfate ester of hydroxyalkyl(meth)acrylate, alkyl phosphonate(meth)acrylate, vinyl alcohol, N-ethyl methacrylamide, N-isopropyl acrylamide, N-vinylpyrollidone, etc.

(A2-d) Emulsion Polymer

As the polymerization operation, vinyl polymerization by general emulsion polymerization is possible; in concrete terms, under the presence of a polymerization catalyst, (A2-d1) an emulsifying dispersant and (A2-d2) a chain transfer agent, the reaction is performed at 50-90° C. for 4-10 hrs to give an emulsion polymer with a concentration of 20-50% of the present invention.

The ratio of the (meth)acrylic acid ester monomer suitable for the present invention is 20-80 parts relative to 100 parts of the total monomers, and more preferably 30-70 parts, furthermore preferably 40-60 parts from the viewpoint of fastness. When the ratio is less than 20 parts, water resistance after crosslinking cannot be obtained; when the ratio is more than 80 parts, the (meth)acrylic acid ester does not become water soluble even after neutralization with a basic substance.

The ratio of the aliphatic vinyl monomer having a carboxyl group is, suitably 80-20 parts relative to 100 parts of the total monomers, more preferably 70-30 parts, and furthermore preferably 60-40 parts, from the viewpoint of a decrease in viscosity during dispersion of the pigment, and time-course viscosity stability. When it is more than 80 parts, water resistance after crosslinking cannot be obtained; when it is less than 20 parts, it does not become soluble to water.

The ratio of the aliphatic vinyl monomer having a non-carboxylic crosslinking functional group is, suitably 0-20 parts relative to 100 parts of the total monomers, and more preferably 0-15 parts. When it is more than 20 parts, pigment dispersibility deteriorates, and it does not become soluble to water depending on the kind of monomer.

The molecular weight after polymerization is suitably 2,000-20,000, and more preferably 3,000-10,000. When it is more than 20,000, dispersion viscosity increases and pigment dispersibility deteriorates. When it is less than 2,000, fixing property of the pigment deteriorates.

(A2-d1) Emulsifying Dispersant

As the emulsifying dispersant, non-ionic or anionic surfactants may be used; when a reactive surfactant that can co-polymerize a monomer upon polymerization is used, water resistance improves.

Examples of the reactive surfactant include polyoxyethylene alkenyl ether ammonium sulfate, polyoxyethylene propenyl phenyl ether, polyoxyalkylene alkenyl ether ammonium sulfate, polyoxyalkylene alkenyl ether, etc., but they are not limited thereto; these may be used singly, or in a combination of two or more kinds.

(A2-d2) Chain Transfer Agent

A chain transfer agent is used to adjust the molecular weight of the emulsion polymer to be 2,000-20,000. Examples include mercapto, carbon tetrachloride, alfa-methylstylene dimer, etc. Among these, mercapto chain transfer agents such as n-octylmercaptan, n-dodecylmercaptan, 3-mercapto propionate, 3,3'-thiodipropionate, thioglycolic acid, etc. are suitable for controlling molecular weight.

In order to adjust the molecular weight to be suitable for dispersant, a chain transfer agent with an amount larger than that generally used for emulsion polymerization is used to decrease the molecular weight.

The amount of blending of the chain transfer agent is preferably 0.02-0.1 relative to total monomers of 1.0, and more preferably 0.04-0.08.

(A2-e) Basic Substance

A basic substance is used as a neutralizer of emulsion polymers, and any basic substance may be used without limitation, including ammonia, basic metal salt, primary amine compound, secondary amine compound, tertiary amine compound, etc.; among these, from the viewpoint of re-dissolution property of pigment dispersions, neutralization with a secondary or tertiary amine compound is preferred. Emulsion polymers are neutralized with these basic substances, to adjust the pH to be 6-9 to give a water-soluble pigment dispersant.

Examples of the neutralizer include isopropylamine, t-butylamine, n-propylamine, N,N-dimethylethanolamine, diethylethanolamine, triethylamine, triethanolamine, etc., but they are not limited thereto; these may be used singly, or in a combination of two or more kinds.

(A3) Hydrophilic Solvent

As the hydrophilic solvent, water and water-soluble organic solvents, etc. may be used.

Examples of water-soluble organic solvent include methanol, ethanol, n-propanol, isopropanol, n-butanol, isobutanol, t-butanol, ethylene glycol, diethylene glycol, triethylene glycol, polyethylene glycol, propylene glycol, butylene glycol, glycerin, diglycerin, 2-pyrrolidone, N-methyl-2-pyrrolidone, propylene glycol monomethyl ether, ethylene glycol monoethyl ether, ethylene glycol monomethyl ether, 3-methoxy-3-methyl-1-butanol, etc., but they are not limited thereto. These may be used singly, or in a combination of two or more kinds.

(A4) Dispersion Auxiliary

As the dispersion auxiliary, by using an anionic surfactant as an aid of dispersing ability of the above water-soluble pigment dispersant, increases in dispersion efficiency, achievement of microfine pigment particles, time-course stability regarding separation during storage, and increases in viscosity can be obtained.

As the anionic surfactant used as a dispersion auxiliary, any anionic surfactant may be used; a polyoxyethylene styrenated phenyl ether sulfate or a polyoxyethylene alkyl ether sulfate with HLB of 10-16 is preferable because they have little effect on fastness, so that a pigment dispersion with excellent long-term stability can be obtained.

(A5) Wet Dispersion by Milling Machine

The pigment dispersion of the present invention is prepared as follows: the above (A1) pigment, (A2) water-soluble pigment dispersant, (A3) hydrophilic solvent, and if necessary, (A4) dispersion auxiliary are mixed and the resulting mixture is wet-dispersed by a milling machine together with glass beads, zirconia beads or titania beads to give a pigment dispersion of the present invention having a mean particle diameter of 200 nm or less and a maximum particle diameter of 500 nm or less.

The ratio of blending (weight) of the pigment to the water-soluble pigment dispersant is preferably in the range of pigment 1.0 to water-soluble pigment dispersant 0.1-2.0; when the ratio of the water-soluble pigment dispersant is less than 0.1, then dispersion viscosity increases, and when it is more than 2.0, then time-course viscosity stability deteriorates.

The amount of blending of the water-soluble pigment dispersant is preferably 5-40 mg per 1 $m^2$ of surface area of the pigment; when it is 5 mg or less, then dispersion viscosity increases, and when it is more than 40, then time-course viscosity stability deteriorates.

When a dispersion auxiliary is used, its ratio of blending (weight) is preferably pigment 1.0 to dispersion auxiliary 0.3 or less. When the ratio of the dispersion auxiliary is more than 0.3, then water resistance decreases, which is not preferred.

(B) Water-Soluble Fixing Agent

The water-soluble fixing agent of the present invention is used for the crosslinking reaction with (A2) the water-soluble pigment dispersant by (C) a crosslinking agent, and for fixing on fibers. In addition, if necessary, (B1) a hot melt resin may be used as an aid of fixing ability.

It is essential that the water-soluble fixing agent of the present invention has a crosslinking functional group that crosslinks with a crosslinking agent; a water-soluble urethane resin, a water-soluble epoxy resin, a water-soluble acrylic resin, and modified PVA with hydrophilic nature, comprising a crosslinking functional group such as carboxyl group, hydroxyl group, sulfonate group, and amide group, may be used. Of these, a water-soluble urethane resin having an acid value of 20-90 mg KOH/g and a hydroxyl value of 20-70 mg KOH/g may be preferably used. More preferably, a range of the acid value of 50-70 mg KOH/g and the hydroxyl value of 30-60 mg KOH/g are preferred. Water-soluble urethane resins having an acid value and a hydroxyl value outside of these ranges are not preferred because they have problems such as being insoluble to water and not having water-resisting fastness.

Water-soluble fixing agents become soluble to water by neutralizing the acidic carboxyl groups or sulfonate groups that exhibit acidic nature using a basic substance.

As the basic substance, any basic substance may be used without limitation, including ammonia, basic metal salt, primary amine compound, secondary amine compound, tertiary amine compound, etc., and among these, from the viewpoint of re-dissolution property, neutralization with a basic metal salt, a secondary or tertiary amine compound is preferred.

The water-soluble fixing agent of the present invention is used to fix a pigment on fibers; however, when the amount of blending is large, while fastness improves, the texture of the fibers hardens. Accordingly, the amount of 20 parts or less relative to 100 parts of the inkjet printing ink of the present invention is preferred, and more preferably 10 parts or less, and furthermore preferably 5 parts or less.

Moreover, in order to soften the fiber texture, it is preferable that the glass transition point (Tg) of the water-soluble fixing agent is in the range from −60° C. to 20° C., and more preferably from −40° C. to 0° C., and furthermore preferably from −30° C. to −10° C.

(B-1) Hot Melt Resin

The hot melt resin in the present invention as an aid of fixing ability is co-used with a water-soluble fixing agent, and its maximum particle diameter must be 500 nm or less.

Furthermore, the hot melt resin does not form a film by drying at normal temperature, but it forms a film by heating at melting point or higher and functions as a fixing agent. Therefore, a problem such as clogging of nozzle during inkjet printing does not occur.

As the hot melt resin, a polyester resin, a polyamide resin, an ethylene vinyl acetate resin, a polyethylene resin and a polypropylene resin prepared by processes such as emulsion polymerization, suspension polymerization, pearl polymerization and forced emulsification may be used in the invention. Furthermore, these resins may be made into an ionomer type using an organic metal salt and used in the invention.

When the amount of blending of the hot melt resin is large, while fastness increases, texture of the fiber hardens; accordingly, the amount is preferably 10 parts or less relative to 100 parts of the inkjet printing ink, and more preferably 5 parts or less, and furthermore preferably 2 parts or less.

(C) Crosslinking Agent

The crosslinking agent has two or more groups having reactivity with a crosslinking functional group of the water-soluble pigment dispersant and of the water-soluble fixing agent upon heating at 100° C. or more, and it crosslinks and fixes the water-soluble pigment dispersant and the water-soluble fixing agent on fibers upon heating; it is preferable that the crosslinking agent itself condensates and fixes on fibers.

Examples of the crosslinking agent include blocked isocyanate compounds, oxazoline compounds, and carbodiimide compounds; of these, a blocked isocyanate compound in which a TMP adduct or isocyanurate of hexamethylene diisocyanate (HDI), hydrogenated xylylene diisocyanate (H6XDI), isophorone diisocyanate (IPDI), or dicyclohexylmethane diisocyanate (H12MDI) is blocked is preferred. As the blocking agent, from the point of dissociation temperature, diethyl malonate (DEM), diisopropyl amine (DIPA), 1,2,4-triazol (TRIA), 3,5-dimethylpyrazol (DMP) and butanoneoxime (MEKO) can be preferably used. These blocked isocyanate compounds may also be used in the form of oligomer in which a part of its isocyanate group is reacted with polyol, polycarbonate, polyester and polyether.

Furthermore, the crosslinking agent is preferably blended in an inkjet printing ink in the form of having water solubility or self emulsifying property by adding a hydrophilic group. In this state, the viscosity of the blended ink can be decreased and re-dispersibility becomes good.

The amount of blending of the crosslinking agent into the inkjet printing ink of the present invention should be correspond to the number of crosslinking functional groups in the water-soluble pigment dispersant and water-soluble fixing agent reacted; it is preferably 20 parts or less relative to 100 parts of the inkjet printing ink, more preferably 10 parts or less, and furthermore preferably 5 parts or less. When the amount of blending is large, texture of the fiber hardens, and when it is small, fastness deteriorates.

2. Preparation of Inkjet Printing Ink

The inkjet printing ink of the present invention comprises the above (A) pigment dispersion having a mean particle diameter of 200 nm or less and a maximum particle diameter of 500 nm or less, consisting of a pigment, a water-soluble pigment dispersant and a hydrophilic solvent, (B) a water-soluble fixing agent, and (C) a crosslinking agent, and said ink has excellent re-dispersibility.

Re-dispersibility of the present invention refers to the following condition: volatile components (most of which is water) in the ink is volatilized under the condition of normal temperature for 3 days or 40° C. for 1 hr, then, when water, alkaline water, or ink is added to the residual nonvolatile components, no re-dispersing occurs to generate aggregates.

In preparing the inkjet printing ink, a water-soluble fixing agent, a crosslinking agent and a hydrophilic solvent are blended into a pigment dispersion having 2-30% of the pigment solid content.

As the hydrophilic solvent, water is mainly used; glycerin as a wetting agent, glycol solvents such as ethylene glycol, propylene glycol and diethylene glycol, as well as hydrophilic solvents such as ethyl alcohol, methyl alcohol, isopropyl alcohol, methyl ethyl ketone, ethyl acetate, butyl cellosolve, ethyl cellosolve, 2-pyrrolidone, N-methyl-2-pyrrolidone, etc. for the adjustment of surface tension, adjustment of solubility, and adjustment of drying speed may be used.

Furthermore, in the inkjet printing inks, components other than the above, including thickening agent, ultraviolet absorbing agent, antioxidizing agent, lubricating agent, wax, defoaming agent, antisetting agent, plasticizer, crosslinking catalyst, chelating agent, etc. may be blended.

The inkjet printing ink wherein these components are blended can be made into an ink suitable for inkjet printing, by adjusting the viscosity to be 3-15 mPa·s at 20° C. and a surface tension to be 27-38 mN/m depending on the kind and quantity of hydrophilic solvent.

In addition, by filtering off and separating large pigment particles of 500 nm or more by filtration or centrifugation, more appropriate inkjet printing ink can be made.

3. Inkjet Printing Method

The inkjet printing method of the present invention is a printing method wherein an inkjet printing ink is printed on a fiber by forming an image by inkjet system using an inkjet printer, then after printing, the fiber is heat treated at 100° C. or more to fix the ink on the fiber.

Temperature and time of the heat treatment is determined by considering heat resistance of the fiber; a temperature higher than the reaction temperature of the crosslinking agent is required in order to achieve sufficient crosslinking. In general heat treatment, it is 100-220° C. and 1-20 min, preferably 100-150° C. and 3-10 min, and more preferably 120-150° C. and 3-5 min.

The inkjet printer is not particularly limited, and a printer equipped with a piezo-type nozzle head is preferred. In the case of thermal type, the crosslinking agent in the ink is thermally cleaved when used for a long time, and polymerization reaction possibly proceeds. With the piezo type, no such problem occurs and long-term stable jetting is possible.

Examples of such printers include EPSON PX-V700, EPSON PM-40000PX, TX-16005 from Mimaki Engineering Co. Ltd., FUJIFILM DMP-2831, and MASTERMIND MMP8130, but they are not limited thereto, and any piezo-type inkjet printer may be used.

Before printing by inkjet system, by pretreating a fiber with a cationated compound, bleeding and permeation of inkjet printing ink can be prevented and high-concentration printing can be carried out; in addition, fastness can be improved by an ion complex between the ink and the cationated compound. Examples of the cationated compound are not particularly limited as long as they are cationic compound; from the viewpoint of improvement in fastness, cationic urethane resin emulsions or acrylic resin emulsions are preferred. Furthermore, in order to add more ionic property, polyamide epichlorohydrin or a vinyl resin having a quaternary ammonium salt at its molecular end may be co-used. In addition to the cationated compound, pretreatment with a crosslinking agent enables printing with better fastness. Furthermore, pretreatment may be carried out by blending crosslinking catalyst, plasticizer, ultraviolet absorbing agent, surfactant, antioxidant, defoaming agent, hydrophilic solvent, anti-drying agent, silica, alumina, etc. Pretreatment method includes padding method, coating method, screen printing method, spraying method or inkjet method.

By applying post-treatment with a post-treatment agent to the fiber printed by the inkjet printing method of the present invention, effects such as improvement in texture, improvement in fastness, prevention of static charge, and prevention of color change can be obtained. Examples of the post-treatment agent include acrylic resin emulsion, urethane resin emulsion, crosslinking agent, silicone oil, and plasticizer, etc.; and antistatic agent, ultraviolet absorbing agent, antioxidant, defoaming agent, anti-drying agent, etc. may be blended therein. As a post-treatment method, padding method, coating method, screen printing method, or spraying method may be used, and inkjet method may also be used.

4. Fiber

The fiber to be printed by the printing method using the inkjet printing ink of the present invention may be any fabric ranging from synthetic fiber, semi-synthetic fiber, natural fiber and inorganic fiber. Furthermore, blend fibers thereof may also be applied, including knitting, woven fabric, non-woven fabric, raised fabric, etc., and printing is possible regardless of fiber morphology, and regardless of forms of cloth and product, etc.

Examples of concrete fiber kinds include nylon, polyester, acryl, lactic acid fiber, acetate, rayon, cotton, silk, wool, hemp, glass fiber, etc.

Clothing using printed fibers includes shirts, sweatshirts, jerseys, pants, one-piece suits, blouses, socks, shoes, handkerchiefs, etc., and products other than clothing include bedcloths, sheets, curtains, car sheets, automotive interior products, bags and flags, etc.

The inkjet printing ink of the present invention enables extremely efficient printing in a small lot, of multiple products within a short delivery time without requiring the cost for screen stencil making similar to the advantages of conventional inkjet printing without screen stencil making; in addition, it adopts the following unique and rational means, i.e., after a water-soluble pigment dispersant is printed, said dispersant is crosslinked by a crosslinking agent to be utilized as a pigment fixing agent, thereby achieving excellent jetting stability upon printing and firmly fixing the pigment after printing; thus it enables to produce high-quality colored fiber products excellent in texture and fastness, without problems in long-term storage of inks and continuous printing properties.

EXAMPLES

Hereinafter, the present invention is described in further detail with reference to Examples; however, the present invention is not limited thereto. Here, "parts" referred to in Examples, etc. means "parts by weight" unless stated otherwise.

Example 1

Water-Soluble Pigment Dispersant 1

A stirrer, a thermometer and dropping funnels were set up in a 1-litter glass flask, into which 442 parts of water and 15 parts of Aqualon KH-10 (reactive surfactant: Dai-ichi Kogyo Seiyaku Co., Ltd.) were introduced, and the temperature was increased to 60° C. with nitrogen replacement while stirring. From the three dropping funnels, the followings were dropped simultaneously for a period of 4 hr: from the first dropping funnel, 100 parts of butyl acrylate, 20 parts of ethyl acrylate, 30 parts of 2-ethylhexyl acrylate, 150 parts of methacrylic acid, 21 parts of Thiokalcol (chain transfer agent: Kao Corporation); from the second dropping funnel, a solution of 3 parts of ammonium persulfate and 108 parts of distilled water; from the third dropping funnel, a solution of 3 parts of sodium hydrogen sulfite and 108 parts of distilled water. After completion of the dropping, reaction was continued at 60° C. for 1 hr. Then, the reaction-synthesized material was naturally cooled to 20° C., and filtered by a metallic mesh, etc. to give an emulsion polymer with 34% solid content. Triethylamine was added to the obtained emulsion polymer to give a water-soluble pigment dispersant 1 with a molecular weight of 8,000 and pH 8.2.

Pigment Dispersion 1

20 parts of a pigment, 6.5 parts of "water-soluble pigment dispersant 1", 50 parts of water, 20 parts of ethylene glycol, 3 parts of urea, and 0.5 parts of SN defoamer 777 (defoaming agent: San Nopco Limited) were mixed and introduced in a milling machine together with 0.3-mm zirconia beads, and dispersed for 1 hr. Then, the zirconia beads were removed and the resulting solution was filtered through a 0.5-µm membrane filter.

Here, the pigments correspond to cyan, magenta, yellow, black; C. I. pigment blue 15:3, C. I. pigment red 122, C. I. pigment yellow 17, and carbon black, respectively, are used, and are referred to as pigment dispersants 1-C, 1-M, 1-Y and 1-K, respectively.

With respect to each color of the pigment dispersant 1, particle size was measured using a particle size analyzer (Microtrack UPA-EX 150: Nikkiso Co., Ltd.); in any color, the mean particle diameter was 200 nm or less, and there were no large particles with the maximum particle diameter of 500 nm or more.

In addition, time-course stability at 60° C. for 1 week of the pigment dispersant 1 of each color was confirmed; as a result there were no changes in viscosity and in particle diameter, indicating that the dispersants were stable.

Inkjet Printing Ink 1

20 parts of "pigment dispersion 1", 18 parts of glycerin, 5 parts of Exceval RS-2117 (water-soluble fixing agent: modified PVA: Kuraray Co., Ltd.), 43 parts of water, 9 parts of Fixer N (blocked isocyanate compound: Matsui Shikiso Chemical Co., Ltd.), 0.5 parts of SN Defoamer 777, 0.5 parts of Emulgen A-60 (nonionic surfactant: Kao Corporation) were mixed with stirring, and 4 parts of water or ethylene glycol were added to adjust the degree of viscosity to be 6 mPa·s at 20° C. and surface tension to be 31 mN/m, giving an inkjet printing ink 1.

The inkjet printing ink 1 with each color of the pigment dispersion 1 is referred to as inkjet printing ink 1-C, 1-M, 1-Y, and 1-K, respectively.

Drying and Re-Dispersibility Test

The inkjet printing ink 1 of each color C, M, Y, and K with an amount of 5 g was placed on a dish, left to stand at room temperature for 3 days, then subjected to drying and re-dispersibility test by dropping alkaline water. The ink was completely re-dispersed and no aggregate was found.

Print Evaluation Test

The inkjet printing ink 1 of each color C, M, Y, and K was deaeration packed and filled in an inkjet printer MMP813BT manufactured by Mastermind Co., Ltd. After printing each ink on cotton broadcloth, polyester pongee fabric, and T/C broadcloth, they were dried at 60° C. for 10 min, and heat-treated at 150° C. for 3 min. Results of the visual check of the printed cloth indicated good quality.

Printing Stability Test

The inkjet printing ink 1 of each color C, M, Y, and K was deaeration packed and filled in an inkjet printer MMP813BT manufactured by Mastermind Co., Ltd., then continuously printed on cotton broadcloth for 10 min. The result showed good printing stability with no missing dots, deflected ink jetting, and no ink splattering. Thereafter, the printer was stopped and left under the temperature of 40° C. for 1 week, then the printer head was cleaned and a test was performed to confirm if a quality similar to that before being left to stand could be obtained. All the inks were completely fine to use, showing good property of jetting stability.

Washing Fastness Test

The inkjet printing ink 1 of each color C, M, Y, and K was deaeration packed and filled in an inkjet printer MMP813BT manufactured by Mastermind Co., Ltd., and printed on cotton broadcloth, polyester pongee fabric, and T/C broadcloth, dried at 60° C. for 10 min, and heat treated at 150° C. for 3 min. Thereafter each of the printed cloth was subjected to washing fastness test JIS L-0217103 for 5 times. Cotton broadcloth and T/C broadcloth showed $4^{th}$ grade, and polyester pongee fabric showed 3-$4^{th}$ grade of good fastness for washing-resistance.

Example 2

Water-Soluble Pigment Dispersant 2

Except that the monomer species of Example 1 was changed to 140 parts of butyl acrylate, 20 parts of ethyl acrylate, 30 parts of 2-ethylhexyl acrylate, 80 parts of methacrylic acid, 10 parts of acrylic acid, and 20 parts of hydroxyethyl acrylate, the procedure identical to that for the water-soluble pigment dispersant 1 was carried out to give a water-soluble pigment dispersant 2 with a molecular weight of 7,000 and pH 8.2.

Pigment Dispersion 2

20 parts of a pigment, 8 parts of "water-soluble pigment dispersant 2", 48.5 parts of water, 20 parts of diethylene glycol, 3 parts of urea, and 0.5 parts of SN defoamer 777 were mixed and introduced in a milling machine together with 0.3-mm zirconia beads and dispersed for 1 hr. Then, the zirconia beads were removed and the resulting dispersion was filtered through a 0.5-µm membrane filter. As the pigments, those used in the pigment dispersion 1 of Example 1 are used, and referred to as pigment dispersions 2-C, 2-M, 2-Y and 2-K, respectively.

Regarding each color of the pigment dispersion 2, the mean particle diameter was 200 nm or less, and no large particles with the maximum particle diameter of 500 nm or more were observed.

In addition, time-course stability at 60° C. for 1 week of the pigment dispersion 2 of each color was confirmed; as a result there were no changes in viscosity and in particle diameter, indicating that the dispersants were stable.

Inkjet Printing Ink 2

20 parts of "pigment dispersion 2", 18 parts of glycerin, 20 parts of WS-101 (water-soluble fixing agent: water-soluble urethane resin: Nippon Polyurethane Industry Co., Ltd.), 28 parts of water, 9 parts of Fixer N, 0.5 parts of SN Defoamer 777, and 0.5 parts of Emulgen A-60 were mixed with stirring, and 4 parts of water or propylene glycol were added to adjust the degree of viscosity to be 4 mPa·s at 20° C. and surface tension to be 31 mN/m, giving an inkjet printing ink 2.

The inkjet printing ink 2 with each color of the pigment dispersion 2 is referred to as inkjet printing ink 2-C, 2-M, 2-Y, and 2-K, respectively.

Drying and Re-Dispersibility Test

Drying and re-dispersibility test was carried out for the inkjet printing ink 2 of each color 2-C, 2-M, 2-Y, and 2-K, similar to Example 1. The inks were completely re-dispersed and no aggregate was found.

Print Evaluation Test

Print evaluation test was carried out for the inkjet printing ink 2, similar to Example 1. Results of the visual check of the printed cloth indicated good quality in all cases.

Printing Stability Test

Printing stability test was carried out for the inkjet printing ink 2, similar to Example 1. The inks showed good printing stability, and also good property of jetting stability.

Washing Fastness Test

Washing fastness test was carried out for the inkjet printing ink 2, similar to Example 1. Cotton broadcloth and T/C broadcloth showed 3-$4^{th}$ grade, and polyester pongee fabric showed 3rd grade of good fastness for washing resistance.

Example 3

Inkjet Printing Ink 3

20 parts of "pigment dispersion 1", 18 parts of glycerin, 15 parts of WS-101AV1 (water-soluble fixing agent: water-soluble urethane resin: Nippon Polyurethane Industry Co., Ltd.), 33 parts of water, 9 parts of Fixer N, 0.5 parts of SN Defoamer 777, and 0.5 parts of Emulgen A-60 were mixed with stirring, and 4 parts of water or propylene glycol were added to adjust the degree of viscosity to be 4 mPa·s at 20° C. and surface tension to be 33 mN/m, giving an inkjet printing ink 3.

The inkjet printing ink 3 with each color of the pigment dispersion 1 is referred to as inkjet printing ink 3-C, 3-M, 3-Y, and 3-K, respectively.

Drying and Re-Dispersibility Test

Drying and re-dispersibility test was carried out for the inkjet printing ink 3 of each color 3-C, 3-M, 3-Y, and 3-K, similar to Example 1. The inks were completely re-dispersed and no aggregate was found.

Print Evaluation Test

Print evaluation test was carried out for the inkjet printing ink 3, similar to Example 1. Results of the visual check of the printed cloth indicated good quality in all cases.

Printing Stability Test

Printing stability test was carried out for the inkjet printing ink 3, similar to Example 1. The inks showed good printing stability, and also good property of jetting stability.

Washing Fastness Test

Washing fastness test was carried out for the inkjet printing ink 3, similar to Example 1. Cotton broadcloth and T/C broadcloth showed $4^{th}$ grade, and polyester pongee fabric showed 3-4th grade of good fastness for washing resistance.

Example 4

Pigment Dispersion 3

20 parts of a pigment, 6.5 parts of "water-soluble pigment dispersant 2" of Example 2, 8 parts of Hitenol NF13 (dispersion auxiliary: anionic surfactant: Dai-ichi Kogyo Seiyaku Co., Ltd.), 42 parts of water, 20 parts of diethylene glycol, 3 parts of urea, and 0.5 parts of SN defoamer 777 were mixed and introduced in a milling machine together with 0.3-mm zirconia beads, and dispersed for 1 hr. Then, the zirconia beads were removed and the resulting dispersion was filtered through a 0.5-µm membrane filter. As the pigment, those used in the pigment dispersion 1 are used, and they are referred to as pigment dispersions 3-C, 3-M, 3-Y and 3-K, respectively.

Regarding each color of the pigment dispersion 3, the mean particle diameter was 200 nm or less, and no large particles with the maximum particle diameter of 500 nm or more were observed.

In addition, time-course stability at 60° C. for 1 week of the pigment dispersion 2 of each color was confirmed; as a result there were no changes in viscosity and in particle diameter, indicating that the dispersants were stable.

Inkjet Printing Ink 4

20 parts of "pigment dispersion 3", 18 parts of glycerin, 20 parts of WS-105 (water-soluble fixing agent: water-soluble urethane resin: Nippon Polyurethane Industry Co., Ltd.), 28 parts of water, 9 parts of AQB-102 (blocked isocyanate compound: Nippon Polyurethane Industry, Co., Ltd.), 0.5 parts of SN Defoamer 777, and 0.5 parts of Emulgen A-60 were mixed with stirring, and 4 parts of water or propylene glycol were added to adjust the degree of viscosity to be 4 mPa·s at 20° C. and surface tension to be 33 mN/m, giving an inkjet printing ink 4.

The inkjet printing ink 4 with each color of the pigment dispersion 3 is referred to as inkjet printing ink 4-C, 4-M, 4-Y, and 4-K, respectively.

Drying and Re-Dispersibility Test

Drying and re-dispersibility test was carried out for the inkjet printing ink 4 of each color 4-C, 4-M, 4-Y, and 4-K, similar to Example 1. The inks were completely re-dispersed and no aggregate was found.

Print Evaluation Test

Print evaluation test was carried out for the inkjet printing ink 4, similar to Example 1. Results of the visual check of the printed cloth indicated good quality in all cases.

Printing Stability Test

Printing stability test was carried out for the inkjet printing ink 4, similar to Example 1. The inks showed good printing stability, and also good property of jetting stability.

Washing Fastness Test

Washing fastness test was carried out for the inkjet printing ink 4, similar to Example 1. Cotton broadcloth and T/C broadcloth showed 3-4$^{th}$ grade, and polyester pongee fabric showed 3rd grade of good fastness for washing resistance.

Example 5

Inkjet Printing Ink 5

20 parts of "pigment dispersion 3" of Example 4, 18 parts of glycerin, 15 parts of WS-101AV1, 5 parts of Chemipearl S-120 (fixing auxiliary agent: hot melt resin: Mitsui Chemicals, Inc.), 28 parts of water, 9 parts of AQB-102, 0.5 parts of SN Defoamer 777, and 0.5 parts of Emulgen A-60 were mixed with stirring, and 4 parts of water or propylene glycol were added to adjust the degree of viscosity to be 4 mPa·s at 20° C. and surface tension to be 33 mN/m, giving an inkjet printing ink 5.

The inkjet printing ink 5 with each color of the pigment dispersion 3 is referred to as inkjet printing ink 5-C, 5-M, 5-Y, and 5-K, respectively.

Drying and Re-Dispersibility Test

Drying and re-dispersibility test was carried out for the inkjet printing ink 5 of each color 5-C, 5-M, 5-Y, and 5-K, similar to Example 1. The inks were completely re-dispersed and no aggregate was found.

Print Evaluation Test

Print evaluation test was carried out for the inkjet printing ink 5, similar to Example 1. Results of the visual check of the printed cloth indicated good quality in all cases.

Printing Stability Test

Printing stability test was carried out for the inkjet printing ink 5, similar to Example 1. The inks showed good printing stability, and also good property of jetting stability.

Washing Fastness Test

Washing fastness test was carried out for the inkjet printing ink 5, similar to Example 1. Cotton broadcloth and T/C broadcloth showed 3-4$^{th}$ grade, and polyester pongee fabric showed 3rd grade of good fastness for washing resistance.

Example 6

Pretreatment

Previously, cotton broadcloth was padded with a pretreatment agent consisting of 15 parts of Saftomer ST-3300 cationic acrylic resin: Mitsubishi Chemical Corporation), 71 parts of water, 10 parts of ethylene glycol, 1 part of Emulgen A-60 (nonionic surfactant: Kao Corporation) and 3 parts of Fixer N, with a squeezing ratio of 60%, and dried at 60° C. for 10 min.

The pretreated cloth obtained was evaluated using the inkjet printing inks of Examples 1-5 in accordance with <print evaluation test>; as a result, strong coloring with sharp printing quality was obtained compared to non-pretreated cloth. In addition, washing fastness was evaluated in accordance with <washing fastness test>, and the result showed that fastness improved by approximately a half grade compared to non-pretreated cloths.

Example 7

Post-Treatment

To the printed cloths of Examples 1-5, a post-treatment agent consisting of 10 parts of Fixer N (blocked isocyanate compound: Matsui Shikiso Chemical Co., Ltd.), 3 parts of Faster XA (acrylic resin emulsion: Matsui Shikiso Chemical Co., Ltd.), 5 parts of Ablation XF (silicone softener: Matsui Shikiso Chemical Co., Ltd.) and 82 parts of water was applied by padding with a squeezing ratio of 60%, and the resulting cloth was dried at 60° C. for 10 min, then heat-treated at 150° C. for 3 min. The obtained post-treated cloth was evaluated in accordance with <washing fastness test>; the result showed an improvement in the washing fastness by approximately half grade compared to printed cloths without post-treatment.

Comparative Example 1

Water-Soluble Pigment Dispersant H1

Except that the monomer species was changed to 130 parts of butyl acrylate, 30 parts of ethyl acrylate, 100 parts of 2-ethylhexyl acrylate, 20 parts of methacrylic acid, and 20 parts of acrylic acid, the procedure identical to that for the water-soluble pigment dispersant 1 was carried out to give a emulsion polymer with a solid content of 34%. When triethylamine was added to the obtained emulsion polymer to adjust the pH to be 9.2, it did not become soluble to water, and was in a cloudy state; thus the water soluble pigment dispersant of the present invention could not be made.

Comparative Example 2

Water-Soluble Pigment Dispersant H2

Except that the monomer species was changed to 50 parts of butyl acrylate and 250 parts of methacrylic acid, the procedure identical to that for the water-soluble pigment dispersant 1 in Example 1 was carried out to give a water-soluble pigment dispersant H2 with a molecular weight of 7,500 and pH 8.1.

Pigment Dispersant H1

Except that "water soluble pigment dispersant 1" in Example 1 was changed to "water-soluble pigment dispersant H2", dispersion was carried out with the procedure identical to that for "pigment dispersion 1" in Example 1. However, the obtained pigment dispersion had high viscosity, and could not be used as a pigment dispersion of the present invention. In addition, with respect to time-course stability at 60° C. for 1 week, viscosity gradually increased and large particles were observed.

Comparative Example 3

Water-Soluble Pigment Dispersant H3

Except that the monomer species was changed to 100 parts of butyl acrylate, 10 parts of ethyl acrylate, 10 parts of 2-ethylhexyl acrylate, 100 parts of methacrylic acid, 10 parts of acrylic acid, and 70 parts of styrene, the procedure identical to that for the water-soluble pigment dispersant 1 in Example 1 was carried out to give a water-soluble pigment dispersant H3 with a molecular weight of 8,100 and pH 8.3.

Pigment Dispersion H2

Except that "water soluble pigment dispersant 1" in Example 1 was changed to "water-soluble pigment dispersant H3", dispersion was carried out with the procedure identical to that for "pigment dispersion 1" of Example 1. However, the obtained pigment dispersion had high viscosity, and could not be used as a pigment dispersion of the present invention. In addition, with respect to time-course stability at 60° C. for 1 week, viscosity gradually increased and large particles were observed.

Comparative Example 4

Pigment Dispersion H3

20 parts of a pigment, 7 parts of Emulgen 108 (non-ionic surfactant: Kao Corporation), 49.5 parts of water, 20 parts of ethylene glycol, 3 parts of urea, and 0.5 parts of SN defoamer 777 (defoaming agent: San Nopco Limited) were mixed and introduced in a milling machine together with 0.3-mm zirconia beads, and dispersed for 1 hr. Then, the zirconia beads were removed and the resulting dispersion was filtered through a 0.5-μm membrane filter.

Inkjet Printing Ink H1

Except that "pigment dispersion 1" of Example 1 was changed to "pigment dispersion H3", the procedure identical to that for "inkjet printing ink 1" of Example 1 was carried out to give an inkjet printing ink H1.

Washing fastness test was carried out for the inkjet printing ink H1 in accordance with <washing fastness test>; cotton broadcloth and T/C broadcloth showed 2nd grade, and polyester pongee fabric showed 1-2nd grade, indicating deteriorated washing fastness.

Comparative Example 5

Inkjet Printing Ink H2

Except that Rikabond 491 (acrylic resin emulsion: Chuo Rika Kogyo Corporation) was used instead of WS-101 in the "inkjet printing ink 2" of Example 2, the same procedure was carried out to give an inkjet printing ink H2.

The inkjet printing ink H2 was evaluated in accordance with <drying and re-dispersibility test>; however, the ink was coated and no dispersibility was exhibited.

In addition, the ink H2 was evaluated in accordance with <print stability test>; however, missing dots and lines are observed due to drying and print stability was not good. Furthermore, after being left to stand at the temperature of 40° C. for 1 week, the ink could not be recovered even after cleaning of the head, and jetting stability was not good.

Comparative Example 6

Inkjet Printing Ink H3

Except that water was used instead of Fixer N in the "inkjet printing ink 1" of Example 1, the same procedure was carried out to give an inkjet printing ink H3.

The inkjet printing ink H3 was evaluated in accordance with <washing fastness test>; cotton broadcloth and T/C broadcloth showed 1-2nd grade, and polyester pongee fabric showed 1st grade, indicating extremely deteriorated washing fastness.

Comparative Example 7

Pigment Dispersion H4

The 0.3-mm zirconia beads in the "pigment dispersion 1" of Example 1 were changed to 0.6-mm glass beads and dispersion was carried out using a milling machine for 1 hr. Then the glass beads were removed and no filtering was performed.

The pigment dispersion H4 with each color was measured using a particle analyzer; in all the colors, the mean particle diameter was 200 nm or more and large particles with the maximum particle diameter of 500 nm or more were observed.

Inkjet Printing Ink H4

Except that the pigment dispersion 1 in the "inkjet printing ink 1" of Example 1 was changed to the pigment dispersion H4, the same procedure was carried out to give an inkjet printing ink H4.

The ink H4 was tested in accordance with "print evaluation test"; clearness of colors lacked and missing dots and lines are observed due to clogging, indicating deteriorated printing.

The above results of Examples and Comparative examples confirmed that each of the prescription of (A) water-soluble pigment dispersant, (B) water-soluble fixing agent and (C) crosslinking agent of the present invention have specific meaning.

The inkjet printing ink exhibits an extremely high level of industrial applicability, by using a pigment dispersion comprising a specific water-soluble pigment dispersant, a specific water-soluble fixing agent, and a specific crosslinking agent as its essential components, in terms of generating synergetic effects by reaction between the water-soluble pigment dispersant and the crosslinking agent, reaction between crosslinking functional groups of the water-soluble fixing agent and the crosslinking agent, and condensation reaction of the crosslinking agent itself, by heating after printing.

What is claimed is:

1. An inkjet printing ink comprising
    (A) a pigment dispersion having a mean particle diameter of 200 nm or less and a maximum particle size of 500 nm or less, consisting of a pigment, a water-soluble pigment dispersant, and a hydrophilic solvent,
    (B) a water-soluble fixing agent, and
    (C) a crosslinking agent, and having properties of crosslinking and being fixed on a fiber by heating, wherein
    the water-soluble pigment dispersant in (A) is an emulsion polymer having a molecular weight of 2,000-20,000 consisting of (1) 20-80 parts of (meth)acrylic acid ester monomer represented by $CH_2=CR^1-COOR^2$ (wherein $R^1$ denotes a hydrogen atom or a methyl group, $R^2$ denotes an alkyl group with a carbon number of 2-8), (2) 80-20 parts of an aliphatic vinyl monomer comprising a carboxyl group, and (3) 0-20 parts of an aliphatic vinyl monomer comprising a non-carboxylic crosslinking functional group, which is neutralized by a basic substance;

the water-soluble fixing agent (B) comprises a crosslinking functional group; and the crosslinking agent (C) comprises a functional group that crosslinks the crosslinking functional group of the water-soluble pigment dispersant in (A) and the crosslinking functional group of the water-soluble fixing agent (B) at a temperature of 100° C. or more.

2. The inkjet printing ink according to claim 1, wherein the emulsion polymer used for the water-soluble pigment dispersant in (A) has been polymerized under the presence of a reactive surfactant.

3. The inkjet printing ink according to claim 1, wherein the aliphatic vinyl monomer (2) comprising a carboxyl group of the water-soluble pigment dispersant in (A) is one or more selected from the group consisting of acrylic acid, methacrylic acid, itaconic acid, maleic acid, and fumaric acid.

4. The inkjet printing ink according to claim 1, wherein a secondary amine or a tertiary amine is used as the basic substance for neutralizing the emulsion polymer with a molecular weight of 2,000-20,000 that constitutes the water-soluble pigment dispersant in (A).

5. The inkjet printing ink according to claim 1, wherein the amount of blending of the water-soluble pigment dispersant in (A) is 5-40 mg per 1 $m^2$ of surface area of the pigment.

6. The inkjet printing ink according to claim 1, wherein a polyoxyethylene styrenated phenyl ether sulfate or a polyoxyethylene alkyl ether sulfate is used as an aid of dispersing ability of the water-soluble pigment dispersant in (A).

7. The inkjet printing ink according to claim 1, wherein the ratio of the blending amounts of the pigment to the water-soluble pigment dispersant in (A) is 1:0.1-2.0.

8. The inkjet printing ink according to claim 1, wherein the water-soluble fixing agent (B) is one or more selected from the group consisting of water-soluble urethane resin, water-soluble epoxy resin, water-soluble acrylic resin, and modified polyvinyl alcohol (PVA).

9. The inkjet printing ink according to claim 8, wherein the glass transition point (Tg) of the water-soluble fixing agent (B) is in the range between −60° C. and 20° C.

10. The inkjet printing ink according to claim 8, wherein the water-soluble urethane resin as the water-soluble fixing agent (B) comprises a carboxyl group and a hydroxyl group which function as both a crosslinking functional group and a hydrophilic group, and has an acid number of 20-90 mg KOH/g and a hydroxyl number of 20-70 mg KOH/g.

11. The inkjet printing ink according to claim 1, wherein a hot melt resin with a maximum particle diameter of 500 nm or less is used as an aid of fixing ability of the water-soluble fixing agent (B).

12. The inkjet printing ink according to claim 1, wherein a water-soluble or self-emulsifying crosslinking agent is used as the crosslinking agent (C) to obtain a property of excellent re-dispersibility.

13. The inkjet printing ink according to claim 1, wherein the crosslinking agent (C) is a blocked isocyanate compound in which a trimethylol propane (TMP) adduct or isocyanurate of hexamethylene diisocyanate (HDI), hydrogenated xylene diisocyanate (H6XDI), isophorone diisocyanate (IPDI) or dicyclohexylmethane diisocyanate (H12MDI) as an isocyanate is blocked.

14. The inkjet printing ink according to claim 13, wherein the crosslinking agent (C) is a blocked isocyanate compound which is blocked by diethyl malonate (DEM), diisopropyl amine (DIPA), 1,2,4-triazol (TRIA), 3,5-dimethylpyrazol (DMP) or 2-butanone oxime (MEKO) as a blocking agent.

15. The inkjet printing ink according to claim 1, wherein the viscosity is in the range of 3-15 mPa·s at 20° C.

16. The inkjet printing ink according to claim 1, wherein the surface tension is in the range of 27-38 mN/m.

17. The inkjet printing ink according to claim 1, wherein large pigment particles of 500 nm or more are filtered off and separated by a filter or centrifugation.

18. An inkjet printing method comprising:
printing a fiber with the inkjet printing ink according to claim 1 by inkjet system, and
heat-treating the fiber at a temperature of 100° C. or more.

19. The inkjet printing method according to claim 18, wherein the fiber is pretreated with a cationic compound by a padding method, a coating method, a screen printing method, a spraying method or an inkjet method.

20. The inkjet printing method according to claim 19, wherein the fiber is pretreated with one or more selected from the group consisting of a urethane resin emulsion, an acrylic resin emulsion and a crosslinking agent, in addition to the cationic compound.

21. The inkjet printing method according to claim 18, wherein the fiber is post-treated with a post-treatment agent by a padding method, a coating method, a screen printing method, a spraying method or an inkjet method.

22. The inkjet printing method according to claim 21, wherein the post-treatment agent is one or more selected from the group consisting of an acrylic resin emulsion, a urethane resin emulsion, a silicone oil, a plasticizer, and a crosslinking agent.

23. A fiber printed by the inkjet printing method according to claim 18.

* * * * *